United States Patent [19]
Bright et al.

[11] Patent Number: 5,651,218
[45] Date of Patent: Jul. 29, 1997

[54] REINFORCEMENT FOR SEALING, GUIDING AND TRIMMING STRIPS

[75] Inventors: Robert G. Bright, Viersen; Norbert Heller, Grefrath, both of Germany

[73] Assignee: Draftex Industries Limited, Edinburgh, Scotland

[21] Appl. No.: 529,877

[22] Filed: Sep. 18, 1995

[30] Foreign Application Priority Data

Oct. 20, 1994 [GB] United Kingdom ............... 9421182
Nov. 18, 1994 [GB] United Kingdom ............... 942333

[51] Int. Cl.⁶ .................................................. E06B 7/16
[52] U.S. Cl. ............................. 49/490.1; 49/498.1
[58] Field of Search .................... 49/490.1, 498.1

[56] References Cited

U.S. PATENT DOCUMENTS

| | | | |
|---|---|---|---|
| 3,222,769 | 12/1965 | Le Plae | 49/490.1 |
| 3,371,447 | 3/1968 | Ruff et al. | 49/490.1 |
| 4,271,634 | 6/1981 | Andrzejewski | 49/490.1 |
| 4,745,665 | 5/1988 | Hilsenbeck | 49/490.1 |
| 4,749,203 | 6/1988 | Bright | 49/490.1 |
| 4,830,898 | 5/1989 | Smith | 49/490.1 |
| 5,302,466 | 4/1994 | Davis et al. | 49/490.1 |

*Primary Examiner*—Brian K. Green
*Assistant Examiner*—Curtis A. Cohen
*Attorney, Agent, or Firm*—Leydig, Voit & Mayer, Ltd.

[57] ABSTRACT

A reinforcing channel-shaped carrier for a sealing, trimming or guiding strip is made of metal and provided with slots of several different types. Slots of a first type extend across the base of the carrier and for short distances into the side walls and facilitate bending about an axis parallel to the base and perpendicular to the length of the channel. Slots of a second type are positioned in the side walls and facilitate bending about an axis perpendicular to the plane of the base. The latter slots are of two different forms. Slots of one form are shorter than those of the other form. This increases the stiffness of the carrier. The carrier is produced by slitting a flat metal blank and then rolling it along stretch paths to cause it to be thinned-down and expanded lengthwise to convert the slits into slots. The carrier is advantageously used in a sealing, trimming or guiding strip in closed loop form ready for fitting to a vehicle door opening.

11 Claims, 5 Drawing Sheets

5,651,218

REINFORCEMENT FOR SEALING, GUIDING AND TRIMMING STRIPS

BACKGROUND OF THE INVENTION

The invention relates to reinforcements for sealing, trimming and guiding strips. Reinforcements embodying the invention, and to be described below by way of example only, are in the form of metal carriers for reinforcing sealing and trimming strips for use in motor vehicle body construction.

SUMMARY OF THE INVENTION

According to the invention, there is provided a reinforcing carrier for a channel-shaped gripping, sealing or trimming strip, comprising resilient material formed into a channel having a base which is integral with two side walls terminating in longitudinal edges defining the mouth of the channel, the material being formed with a plurality of regularly arranged through slots arranged side-by-side along its length, the slots comprising slots of a first type and slots of a second type, each slot of the first type extending continuously across the base and slightly into each side wall to provide flexibility for the carrier when curved about an axis parallel to the plane of the base and perpendicular to the length of the strip, the slots of the second type being formed in the side wall and extending from a point inboard of the edge thereof towards the base to provide flexibility for the carrier when curved about an axis perpendicular to the plane of the base.

DESCRIPTION OF DRAWINGS

Sealing, guiding and trimming strips embodying the invention, and such strips incorporating metal carriers embodying the invention, will now be described, by way of example only, with reference to the accompanying diagrammatic drawings in which.

DESCRIPTION OF PREFERRED EMBODIMENTS

Figure 1:
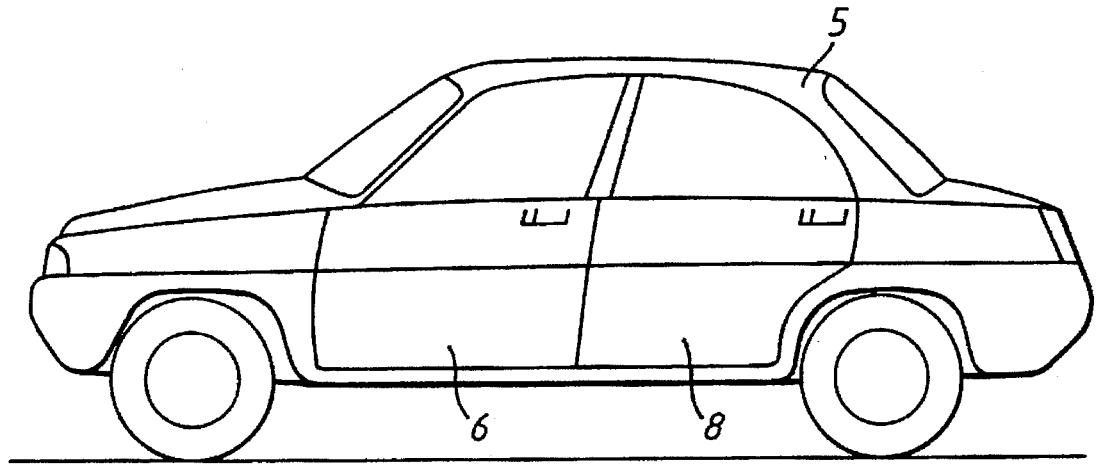
FIG. 1 is a side view of a motor vehicle body on which the strips can be used.

As shown in FIG. 1, a motor vehicle body 5 has doors 6,8. In order to provide a weather-proof seal around each door opening, a sealing strip is mounted on a flange 10 (see FIGS. 2 and 5) running around each door opening. The flange 10 is formed where the inner and outer body panels meet at the edge of the door opening and are welded together to form a flange lying in the plane of the door opening. Instead, or in addition, a sealing strip may be mounted around the edge of the door itself.

Figure 2:
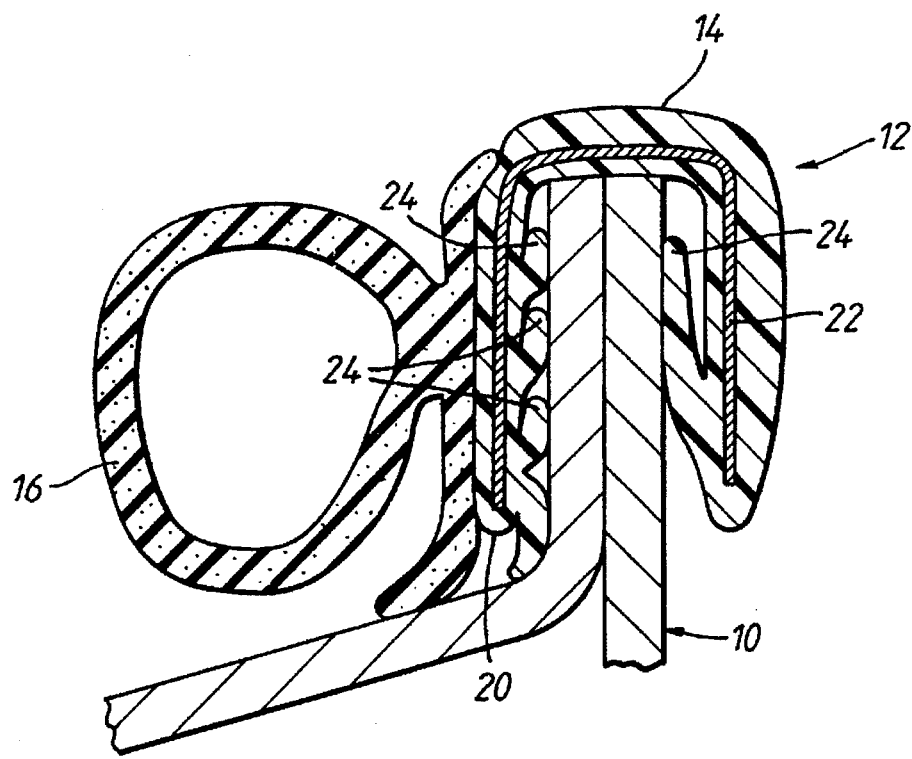
FIG. 2 is a cross-sectional view through one of the sealing and trimming strips, taken on the line II—II of FIG. 5.

FIG. 2 shows one of the sealing strips 12. It comprises a channel-shaped gripping portion 14 and a soft tubular sealing portion 16. In use, the sealing strip 12 is mounted so that the gripping portion 14 embracingly grips the flange 10. The strip 12 thus supports the sealing portion 16 so that it runs around the door opening on the latter's outside. The closing door closes onto the sealing portion 16, partially compressing it and providing a weather-proof seal.

The sealing strip 12 is preferably made of extruded plastics or rubber material 20. The sealing portion 16 is preferably made of extruded rubber, and softer than the material 20 of the gripping portion 14. Advantageously, the rubber of the sealing portion 16 is foamed or cellular. The material 20 of the gripping portion 14 and the material of the sealing portion 16 may be co-extruded. Instead, however, the gripping portion may be produced separately and the sealing portion 16 then secured in position by means of adhesive.

An important feature of the sealing strip 12 is reinforcement in the form of a channel-shaped metal core or carrier 22, which will be described in detail below. The carrier 22 is made of resilient metal and helps to ensure that the gripping portion 14 grips the flange 10 securely.

In addition, the extruded material 20 forms integral gripping lips 24 which make contact with the opposite faces of the flange 10 and help to resist removal of the strip from the flange. Advantageously, the material of the lips, although co-extruded with the channel-shaped material, is of softer consistency than the material 20, its softness increasing its frictional contact with the flange.

The metal carrier 22 is advantageously incorporated into the extruded material by means of a known cross-head extrusion process.

The arrangement of the lips 24 shown in FIG. 1 is purely by way of example; there may be more or fewer lips on each side of the channel and they can be of different sizes.

Figure 3:
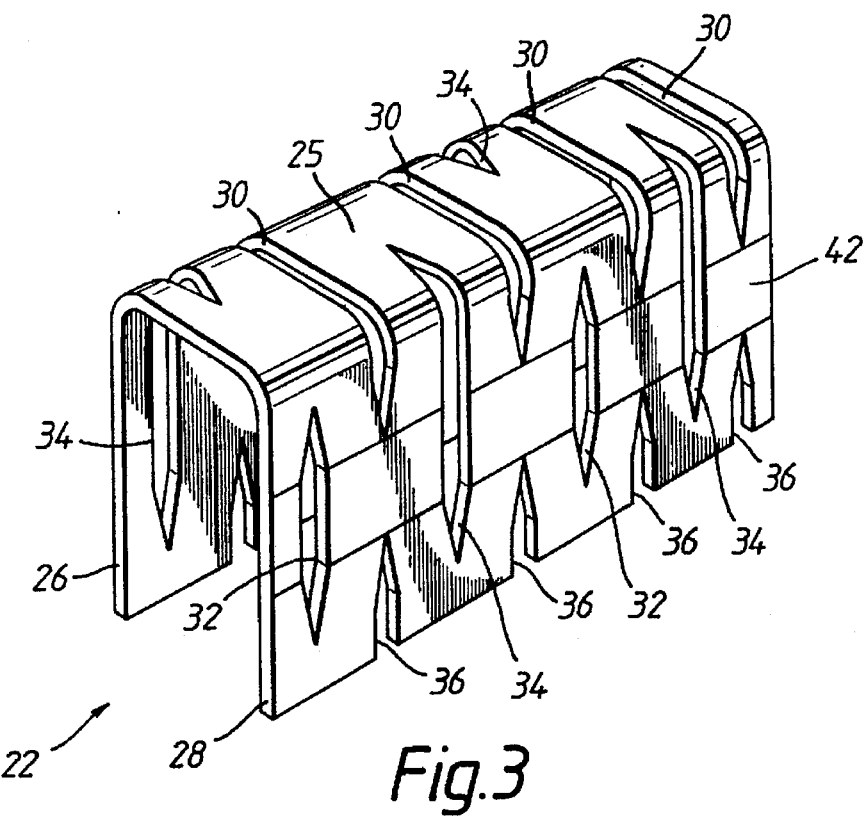
FIG. 3 is a perspective view of one of the metal carriers incorporated in the strip of FIG. 2.

The metal carrier 22 is illustrated in FIG. 3.

The carrier 22 comprises a metal channel having an inverted base 25 and sides 26 and 28, and formed with regularly arranged slots.

Firstly, there are slots 30. Each slot 30 extends completely across the base 25 and then for less than halfway down each side 26,28 (extending for an equal distance down each of the two sides).

The second slots 32 are arranged in each of the sides 26,28. The length of each slot 32 is slightly less than the depth of each side 26,28.

The slots 34 are again arranged in each side 26,28. The slots 34 alternate with the slots 32. Each slot 34 is longer than the slots 32 and extends partway across the base 24.

Each slot 32 in one of the two side walls 26,28 is aligned across the channel with a slot 34 in the opposite side wall.

Finally, slots 36 are provided in the side walls 26,28. Each slot 36 is positioned between a slot 32 and a slot 34. Each slot 36 extends from the distal edge of the respective side wall 26,28 and for a short distance up each side wall.

The metal carrier may be produced in any convenient way.

Figure 4:
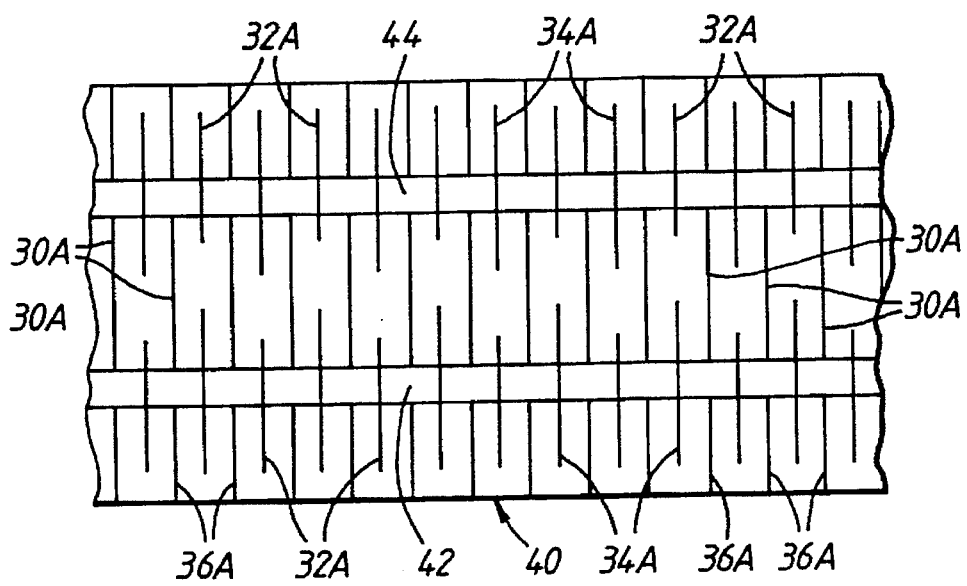
FIG. 4 is a plan view of the metal carrier of FIG. 3 at a stage during its manufacture.

Advantageously, however, it is produced by slitting and then stretching a flat metal blank and then bending the blank into channel-form. This process is illustrated with reference to FIG. 4 which shows a flat metal blank 40 of indefinite length which is fed through a cutter arrangement (for example, a pair of rotary cutters) which cut slits through it at predetermined positions. These slits become formed into the slots 30,32,34 and 36 of FIG. 3. The slits in FIG. 4 are thus correspondingly referenced but with the addition of the suffix "A".

The slits 30A,32A,34A and 36A become converted, respectively into the slots 32,34,36 and 38 by means of a stretching operation. This is carried out by passing the slitted blank 40 between a pair of inter-engaging compressing rollers which apply compression to the blank along two "stretch paths" 42,44. The material of the blank 40 becomes thinned-down, along these stretch paths 42,44. This thinning-down of the material causes it to expand lengthwise, or to become stretched, so that the slits 30A, 32A,34A and 36A become expanded and respectively form the slots 30,32,34 and 36. The blank is thereafter bent into channel form. FIG. 3 shows the position of the stretch path 42 along side 28; stretch path 44 along side 26 is not visible in FIG. 3.

Instead, however, the carrier may be made by directly cutting the slots in a blank, using a suitable stamping machine for example; in other words, a stretching operation is not performed.

Figure 5:
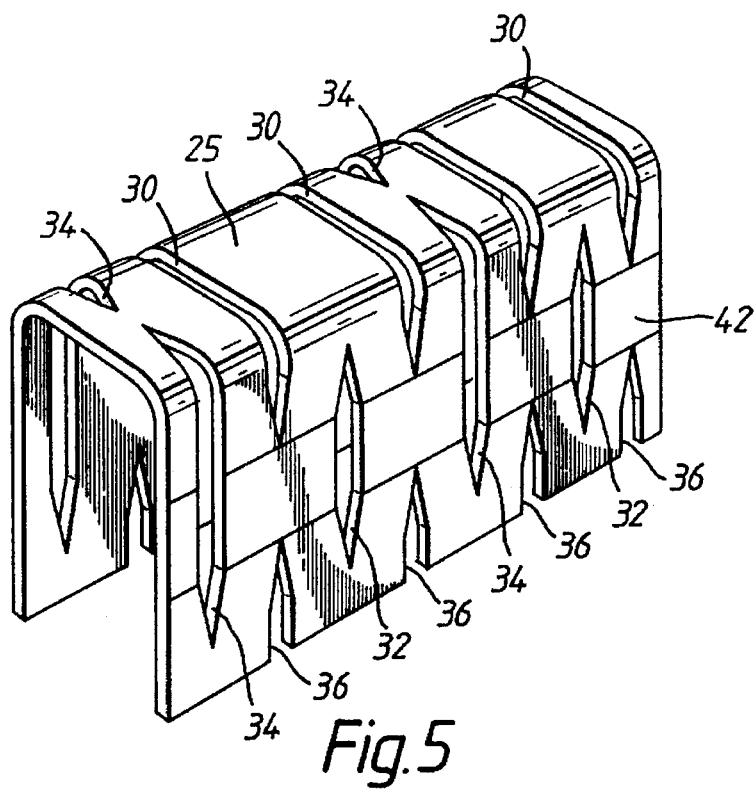
FIG. 5 is a perspective view of a modified form of the carrier shown in FIG. 3.

FIG. 5 shows a modified form of the carrier 22 of FIG. 3. In the carrier of FIG. 5, each slot 32 in one of the side walls 26,28 is aligned across the channel with one of the slots 32 in the opposite side wall. The carrier of FIG. 5 may be made in the same way as shown in FIG. 4 except that the slits 32A would be aligned with each other across the width of the blank 40.

Figure 6:
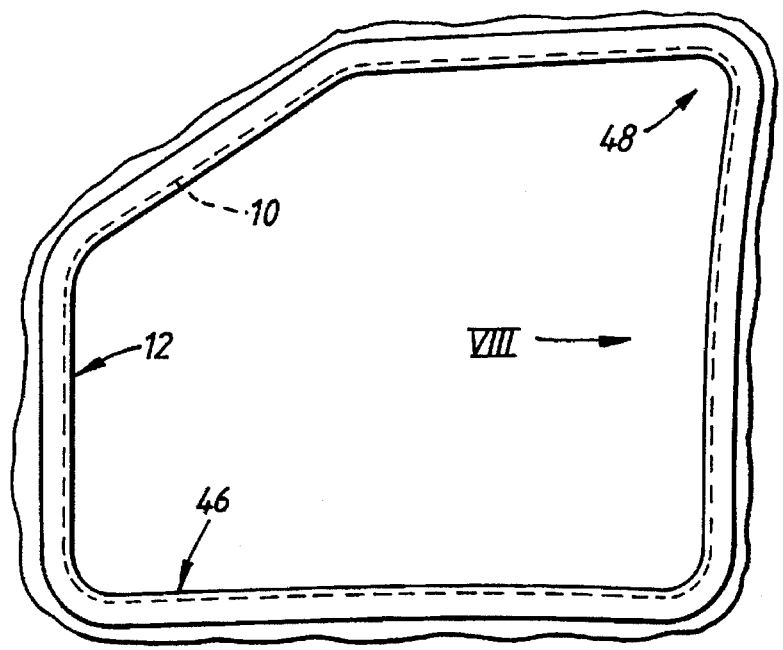
FIG. 6 is a view of the sealing strip of FIG. 2 in closed-loop form.

Advantageously, the complete sealing strip 12 to suit a particular door opening 6 is pre-formed into a closed-loop as shown at 46 in FIG. 6. It is delivered to the motor manufacturer in this form. This form is advantageous because the fitting process is simplified. The fitter merely has to offer the closed-loop frame up to the door opening, bending it inwards as necessary to fit it onto the flange, completing the process by pressing the channel-shaped gripping portion 14 onto the flange around the periphery of the door opening. Alternatively, this process can be carried out using a suitable hand fitting tool or by means of a robot. The process is much simplified as compared with fitting a sealing strip of indeterminate length onto the flange around the door opening. This process requires the handling of an indeterminate length of strip, pressing it onto the flange, and then cutting it and securing the two ends together in some suitable way, and is time-consuming and unsatisfactory in certain respects.

The form of carrier 22 shown in FIG. 3 or 5 is particularly advantageous for use in a sealing strip to be supplied in a closed-loop, as shown in FIG. 6. This is because the arrangement of slots 30,32,34 and 36, although permitting the necessary bending (as will be explained in more detail below with reference to FIGS. 7 and 8), nevertheless ensures that the carrier remains relatively stiff. In particular, the carrier is relatively stiff as compared with prior forms of carrier in which the slots are more extensive so that the carrier effectively comprises a series of inverted U-shaped elements arranged side by side to define the channel and with their legs connected together by short connecting links. Such a carrier, although satisfactory for some applications, is very flexible. Closed-loop forms of strip formed with such prior types of carrier are thus very flexible and are more difficult to handle and to fit. In contrast, the use of the slots 32 and 34 of different lengths is, in the carrier of FIG. 3 or FIG. 5, found to be advantageous in increasing the stiffness of the closed loop. It is found that, if these slots have the same length, the closed loop 46 (FIG. 6) is less able to retain its shape during assembly by the fitter onto the flange 10, making this assembly process much more difficult.

Although the strip has been illustrated in the form of a door seal, it could equally well be embodied as a seal for a luggage compartment of a vehicle. In this case, the sealing portion 16 would be mounted to run along the outside of the base of the gripping portion 14 instead of along one of its sides. Instead, the strip can be in the form of a channel for window guiding and sealing purposes.

Figure 7:
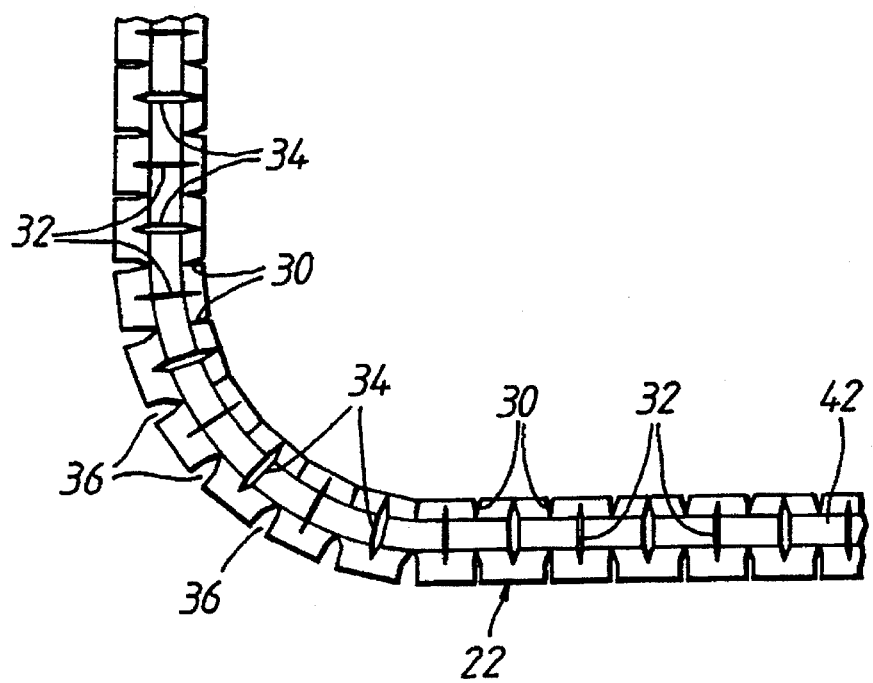
FIG. 7 is a scrap side view of part of the carrier of FIG. 3 showing its appearance when following a first type of bend.
Figure 8:
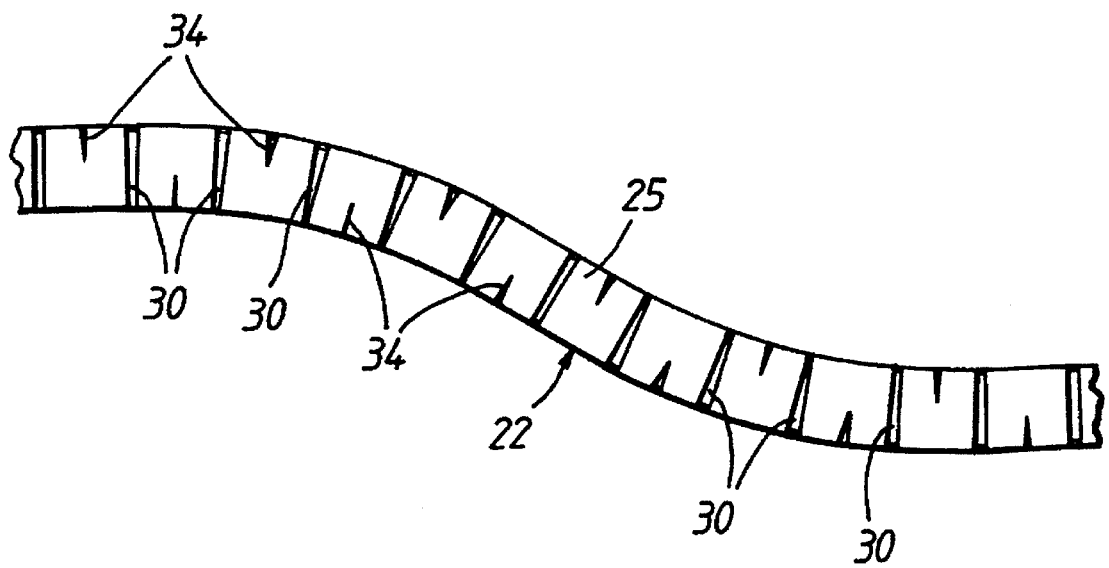
FIG. 8 is a scrap side view of another part of the carrier of FIG. 3, showing its appearance when following a second type of bend.

The advantages following from the arrangement of slots in the carrier 22 are illustrated in more detail in FIGS. 7 and 8. FIGS. 7 and 8 illustrate different forms of bend which the strip 12, and thus the carrier 22, has to undergo in use.

FIG. 7 is an enlarged view of the corner 48 (see FIG. 6) in the door opening 6. As shown, the flange 10 at this corner is sharply curved (and this may be the same for other corners in the door opening). The sealing strip 12 therefore has to bend correspondingly, the metal carrier 22 also of course bending. FIG. 7 illustrates the bending carrier 22, the rest of the sealing strip being omitted for clarity.

FIG. 8 is a view taken in the direction of the arrow VIII of FIG. 6. As shown, the flange 10 is curved with respect to the vertical plane, and this Figure again illustrates the metal carrier 22 with the remainder of the sealing strip being omitted for clarity.

These two different types of bending (FIGS. 7 and 8) are accommodated by the arrangement of slots in the metal carrier 22. Thus, the form of bending shown in FIG. 7 is primarily accommodated by the slots 30 in the base 24 of the carrier (see FIG. 3 or 5). The form of bending shown in FIG. 8, on the other hand, is primarily accommodated by the slots 32 and 34 (FIG. 3 or 5).

If desired, the strip (and thus the carrier as well) can be produced with the side walls of the channel of the gripping portion 14 slightly splayed apart. This eases assembly onto the flange 10. Thereafter, the side walls can be pressed tightly into contact with the flange using a suitable tool.

Figure 9:
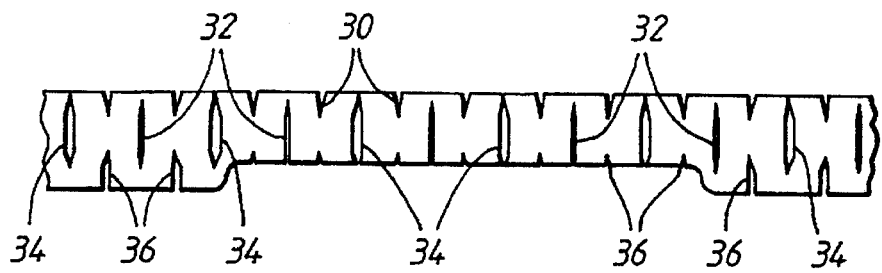
FIG. 9 is a side view of a modified form of the carrier of FIG. 3.

FIG. 9 shows how, along part of its length only, the height of each of the side walls 26,28 may be reduced by cutting it along or near the stretch path 42,44 (for clarity, the stretch paths 42,44 are not indicated in FIG. 9, but FIG. 7 shows the position of the stretch path 42, the stretch path 44 being similarly positioned on the other side of the channel). This helps to increase the flexibility of the carrier and may be carried out over those regions of the carrier where the strip is to be bent to follow bends of the form shown in FIG. 7. Only one of the side walls 26,28 need be modified in this way if desired.

Figure 10:
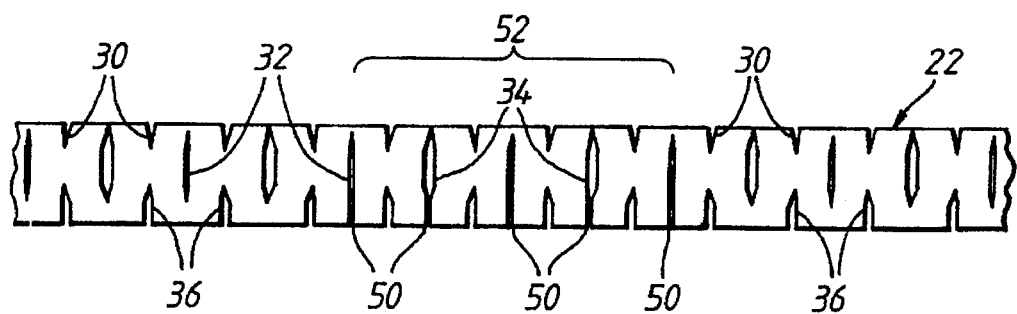
FIG. 10 is a side view of a further modified form of the carrier of FIG. 3.
Figure 11:
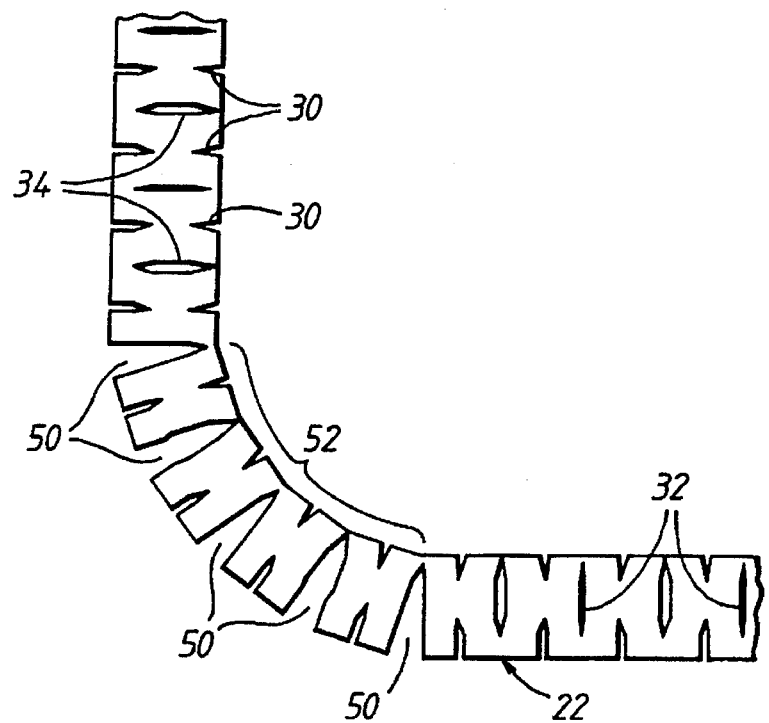
FIG. 11 shows the carrier of FIG. 10 bent to follow the first type of bend illustrated in FIG. 7.

FIG. 10 shows a modification in which the carrier is formed with additional saw cuts or slits 50 over along a region 52 where the carrier is bent to follow a curve of the type shown in FIG. 7. Each cut 50 is aligned with a slot 32 or 34 (see FIG. 4 or 5) and joins that slot to the free edge of the respective side wall 26,28. FIG. 11 shows how these saw cuts help the carrier to bend when following a curve.

What is claimed is:

1. A longitudinally extending reinforcing carrier for a channel-shaped gripping, sealing or trimming strip, comprising resilient material formed into a channel having a base which is integral with two side walls terminating in longitudinal edges defining a mouth of the channel, the material being formed with a plurality of regularly arranged through slots arranged side-by-side along its length, the slots extending substantially perpendicular to the longitudinal extension of the carrier and comprising slots of a first type and slots of a second type, the slots of the second type comprising slots of a first form and slots of a second form, each slot of the first type extending continuously across the base and for a significant distance into each side wall, but for less than half the depth of each side wall from the base of the channel to the longitudinal edge of that side wall, the slots of the first type providing flexibility for the carrier when curved about an axis parallel to the plane of the base and perpendicular to the length of the strip, and the slots of the second type being formed in each side wall and extending from a point inboard of the respective said edge thereof towards the base to provide flexibility for the carrier when curved about an axis perpendicular to the plane of the base, the slots of the first and second forms of the second type alternating with each other along each side wall, the slots of the first form of the second type terminating short of the base and the slots of the second form of the second type extending into and partway across the base, the slots of the second type being arranged in pairs of opposed slots, each said pair consisting of a slot of the first form of the second type of slot in one side wall aligned with a respective slot of the second form of the slots of the second type in the opposite side wall, the slots of the first and second types alternating with each other along the length of the carrier.

2. A carrier according to claim 1, including slots of a third type in both side walls, each slot of the third type extending from the edge of the respective side wall towards the base but over less than half of the extent of the side wall in that direction.

3. A carrier according to claim 2, in which each slot of the first type is aligned with two slots of the third type.

4. A carrier according to claim 1, in which the resilient material is metal.

5. A carrier according to claim 4, having two paths respectively running along its two side walls, the material of the carrier having been subjected to thinning down along these two paths to expand the widths of the slots.

6. A carrier according to claim 1, in which, along part of its length only, the height of at least one of the side walls is reduced.

7. A carrier according to claim 2, in which, along part of its length only, the height of at least one of the side walls is reduced, the reduction in height removing the slots of the third type but not affecting the slots of the first type.

8. A carrier according to claim 1, in which, along part of its length only, at least one slit is cut in and through at least one of its side walls, the slit being parallel to a said slot of the second type and extending from the longitudinal edge of that side wall to terminate in or adjacent to the base.

9. A carrier according to claim 2, in which, along part of its length only, at least one slit is cut in and through at least one of its side walls, said slit being parallel to a said slot of the second type and extending from the longitudinal edge of that side wall to terminate in or adjacent to the base, the slit being additional to the slots of the third type.

10. A carrier according to claim 8, in which said slit is aligned with and opens into a respective slot of the second type.

11. A carrier according to claim 9, in which said slit is aligned with and opens into a respective slot of the second type.

* * * * *